US008352257B2

(12) United States Patent
Hetherington et al.

(10) Patent No.: US 8,352,257 B2
(45) Date of Patent: Jan. 8, 2013

(54) SPECTRO-TEMPORAL VARYING APPROACH FOR SPEECH ENHANCEMENT

(75) Inventors: Phil A. Hetherington, Port Moody (CA); Xueman Li, Burnaby (CA)

(73) Assignee: QNX Software Systems Limited, Kanata, Ontario (CA)

(*) Notice: Subject to any disclaimer, the term of this patent is extended or adjusted under 35 U.S.C. 154(b) by 761 days.

(21) Appl. No.: 11/961,681

(22) Filed: Dec. 20, 2007

(65) Prior Publication Data

US 2008/0167866 A1 Jul. 10, 2008

Related U.S. Application Data

(60) Provisional application No. 60/883,507, filed on Jan. 4, 2007.

(51) Int. Cl.
*G10L 21/02* (2006.01)
*G10L 11/00* (2006.01)
*G10L 15/00* (2006.01)
*H04B 15/00* (2006.01)

(52) U.S. Cl. ..................... 704/226; 704/200; 704/200.1; 704/231; 704/233; 704/236; 381/71.1; 381/94.1; 381/94.2; 381/94.3

(58) Field of Classification Search .................. 704/233, 704/226, 236, 231, 200.1, 200
See application file for complete search history.

(56) References Cited

U.S. PATENT DOCUMENTS 5,012,519 A * 4/1991 Adlersberg et al. ........... 704/226
5,826,222 A * 10/1998 Griffin .......................... 704/207
5,839,101 A * 11/1998 Vahatalo et al. .............. 704/226
6,289,309 B1 * 9/2001 deVries ......................... 704/233
6,810,273 B1 * 10/2004 Mattila et al. ................. 455/570
7,376,558 B2 * 5/2008 Gemello et al. .............. 704/226
2002/0169602 A1 * 11/2002 Hodges ......................... 704/211
2006/0271362 A1 * 11/2006 Katou et al. .................. 704/233
2008/0159559 A1 * 7/2008 Akagi et al. .................... 381/92

OTHER PUBLICATIONS

Hasan, M.K.; Salahuddin, S.; Khan, M.R., "A modified a priori SNR for speech enhancement using spectral subtraction rules," Signal Processing Letters, IEEE , vol. 11, No. 4, pp. 450-453, Apr. 2004.*

(Continued)

*Primary Examiner* — Paras D Shah
(74) *Attorney, Agent, or Firm* — Brinks Hofer Gilson & Lione

(57) ABSTRACT

The present system proposes a technique called the spectro-temporal varying technique, to compute the suppression gain. This method is motivated by the perceptual properties of human auditory system; specifically, that the human ear has higher frequency resolution in the lower frequencies band and less frequency resolution in the higher frequencies, and also that the important speech information in the high frequencies are consonants which usually have random noise spectral shape. A second property of the human auditory system is that the human ear has lower temporal resolution in the lower frequencies and higher temporal resolution in the higher frequencies. Based on that, the system uses a spectro-temporal varying method which introduces the concept of frequency-smoothing by modifying the estimation of the a posteriori SNR. In addition, the system also makes the a priori SNR time-smoothing factor depend on frequency. As a result, the present method has better performance in reducing the amount of musical noise and preserves the naturalness of speech especially in very noisy conditions than do conventional methods.

14 Claims, 6 Drawing Sheets

OTHER PUBLICATIONS

Diethorn, E. “Subband Noise Reduction Methods for Speech Enhancement.” Audio Signal Processing for Next-Generation Multimedia Communciation Systems. Springer. 2004. pp. 91-115, especially pp. 106 and 109.*

G. Doblinger, “Computationally efficient speech enhancement by spectral minima tracking in subbands,” in Proc. 4th Eur. Conf. Speech Com-munication Technology EUROSPEECH’95. Madrid, Spain, Sep. 1995,pp. 1513-1516.*

Linhard, Klaus and Haulick, Tim (1998): “Spectral noise subtraction with recursive gain curves”, In ICSLP-1998, paper 0109.*

Cohen, I., “Speech enhancement using a noncausal a priori SNR estimator,” Signal Processing Letters, IEEE , vol. 11, No. 9, pp. 725-728, Sep. 2004.*

Shifeng Ou; Xiaohui Zhao; Ying Gao, “Speech Enhancement Employing Modified a Priori SNR Estimation,” Software Engineering, Artificial Intelligence, Networking, and Parallel/Distributed Computing, 2007. SNPD 2007. Eighth ACIS International Conference on , vol. 3, no., pp. 827-831, Jul. 30, 2007-Aug. 1, 2007.*

Hasan, K.; Akter, L.; , “Quality improvement of enhanced speech in DCT domain using modified a priori SNR,” Signal Processing and Information Technology, 2003. ISSPIT 2003. Proceedings of the 3rd IEEE International Symposium on , vol., no., pp. 733-736, Dec. 14-17, 2003.*

Lu, Ching et all. An Optimal Smoothing Factor for Reducing Musical Residual Noise in Speech Enhancement. Asia University, Taiwan 2006.*

Ephraim, Y. et al.; “Speech Enhancement Using A Minimum-Mean Square Error Short-Time Spectral Amplitude Estimator”; IEEE Trans. on Acoustics, Speech, and Signal Processing, vol. 32, Issue 6; Dec. 1984; pp. 1109-1121.

Ephraim, Y. et al.; “Speech Enhancement Using A Minimum Mean-Square Error Log-Spectral Amplitude Estimator”; IEEE Trans on Acoustics, Speech, and Signal Processing, vol. 33, Issue 2; Apr. 1985, pp. 443-445.

Linhard, K. et al.; “Spectral Noise Subtraction with Recursive Gain Curves”; 5th International Conference on Spoken Language Processing, Sydney, Australia; Nov. 30 to Dec. 4, 1998.

* cited by examiner

SPECTRO-TEMPORAL VARYING APPROACH FOR SPEECH ENHANCEMENT

RELATED APPLICATIONS

This application claims priority to U.S. Provisional Patent Application Ser. No. 60/883,507, entitled "A Spectro-Temporal-Varying Approach For Speech Enhancement" filed on Jan. 4, 2007, and is incorporated herein in its entirety by reference.

BACKGROUND OF THE SYSTEM

1. Technical Field

The system is directed to the field of sound processing. More particularly, this system provides a way to enhance speech recognition using spectro-temporal varying, technique to computer suppression gain.

2. Background of the Invention

Speech enhancement often involves the removal of noise from a speech signal. It has been a challenging topic of research to enhance a speech signal by removing extraneous noise from the signal so that the speech may be recognized by a speech processor or by a listener. Various approaches have been developed in the prior art. Among these approaches the spectral subtraction methods are the most widely used in real-time applications. In the spectral subtraction method, an average noise spectrum is estimated and subtracted from the noisy signal spectrum, so that average signal-to-noise ratio (SNR) is improved. It is assumed that when the signal is distorted by a broad-band, stationary, additive noise, the noise estimate is the same during the analysis and the restoration and that the phase is the same in the original and restored signal.

Subtraction-type methods have a disadvantage in that the enhanced speech is often accompanied by a musical tone artifact that is annoying to human listeners. There are a number of distortion sources in the subtraction type scheme, but the dominant distortion is a random distribution of tones at different frequencies which produces a metallic sounding noise, known as "musical noise" due to its narrow-band spectrum and the tin-like sound.

This problem becomes more serious when there are high levels of noise, such as wind, fan, road, or engine noise, in the environment. Not only does the noise sound musical, the remaining voice left unmasked by the noise often sounds "thin", "tinny", or musical too. In fact, the musical noise has limited the performance of speech enhancement algorithms to a great extent.

Various solutions have been proposed to overcome the musical noise problem. Most of them are directed toward finding an improved estimate of the SNR using constant or adaptive time-averaging factors. The time-averaging based methods are effective in removing music noise, however at a cost of degrading the speech signal and also introducing unwanted delay to the system.

Another method of removing music noise is by overestimating the noise, which causes the musical tones to also be subtracted out. Unfortunately, speech that is close in spectral magnitude to the noise is also subtracted out producing even thinner sounding speech.

A classical speech enhancement system relies on the estimation of a short-time suppression gain which is a function of the a priori Signal-to-Noise Ratio (SNR) and or the a posteriori SNR. Many approaches have been proposed over the years on how to estimate the a priori SNR when only the noisy speech is available. Examples of such prior art approaches include Ephraim, Y.; Malah, D.; *Speech Enhancement Using A Minimum-Mean Square Error Short-Time Spectral Amplitude Estimator*, IEEE Trans. on Acoustics, Speech, and Signal Processing Volume 32, Issue 6, December 1984 Pages: 1109-1121 and Linhard, K, Haulick, T; *Spectral Noise Subtraction With Recursive Gain Curves*, $5^{th}$ International Conference on Spoken Language Processing, Sydney, Australia, Nov. 30-Dec. 4, 1998.

In Ephraim, Y.; Malah, D.; *Speech Enhancement Using A Minimum Mean-Square Error Log-Spectral Amplitude Estimator*, IEEE Trans on Acoustics, Speech, and Signal Processing, Volume 33, Issue 2, April 1985 Pages: 443-445, Ephraim and Malah proposed a decision-directed approach which is widely used for speech enhancement. The a priori SNR calculated based on this approach follows the shape of a posteriori SNR. However, this approach introduces delay because it uses the previous speech estimation to compute the current a priori SNR. Since the suppression gain depends on the a priori SNR, it does not match with the current frame and therefore degrades the performance of the speech enhancement: system. This approach is described below.

Classical Noise Reduction Algorithm

In the classical additive noise model, the noisy speech is given by $$y(t)=x(t)+d(t)$$

Where x(t) and d(t) denote the speech and the noise signal, respectively.

Let $|Y_{n,k}|$, $|X_{n,k}|$, and $|D_{n,k}|$ designate the short-time Fourier spectral magnitude of noisy speech, speech and noise at nth frame and kth frequency bin. The noise reduction process consists in the application of a spectral gain $G_{n,k}$ to each short-time spectrum value. An estimate of the clean speech spectral magnitude can be obtained as:

$$|\hat{X}_{n,k}|=G_{n,k}|Y_{n,k}|$$

The spectral suppression gain $G_{n,k}$ is dependent on the a posteriori SNR defined by $$SNR_{post}(n,k)=\frac{|Y_{n,k}|^2}{E\{|D_{n,k}|^2\}}$$

and the a priori SNR is defined by $$SNR_{priori}(n,k)=\frac{E\{|X_{n,k}|\}^2}{E\{|D_{n,k}|^2\}}.$$

Since speech and noise power are not available, the two SNRs have to be estimated. The a posteriori SNR is usually calculated by:

$$S\hat{N}R_{post}(n,k)=\frac{|Y_{n,k}|^2}{\sigma(n,k)^2}$$

Here, $\sigma(n,k)^2$ is the noise estimate.

The a priori SNR can be estimated in many different ways according to the prior art. The standard estimation without recursion has the form:

$$S\hat{N}R_{priori}(n,k)=S\hat{N}R_{post}(n,k)-1 \quad (1)$$

Another approach for a priori SNR estimation is known as a "decision-directed" recursive version and is proposed in the prior art as:

$$S\hat{N}R_{priori}(n,k)=\alpha\frac{|\hat{X}(n-1,k)|^2}{|\sigma(n,k)|^2}+(1-\alpha)P(S\hat{N}R_{post}(n,k)-1) \quad (2)$$

A simpler recursive version is proposed in another approach as:

$$S\hat{N}R_{priori}(n,k)=G(n-1,k)S\hat{N}R_{post}(n,k)-1 \quad (3)$$

Where G(n,k) is the so-called Wiener suppression gain calculated by:

$$G(n,k)=\frac{S\hat{N}R_{priori}(n,k)}{S\hat{N}R_{priori}(n,k)+1}$$

In general, the suppression gain is a function of the two estimated SNRs.

$$G(n,k)=f(S\hat{N}R_{priori}(n,k),S\hat{N}R_{post}(n,k)) \quad (4)$$

As noted above, because the suppression gain depends on the a priori SNR, it does not match with the current frame and therefore degrades the performance of the speech enhancement system.

BRIEF SUMMARY OF THE INVENTION

The present system proposes a technique called the spectro-temporal varying technique to compute the suppression gain. This method is motivated by the perceptual properties of human auditory system; specifically, that the human ear has better frequency resolution in the lower frequencies band and less frequency resolution in the higher frequencies, and also that the important speech information in the high frequencies are consonants which usually have random noise spectral sh ape. A second property of the human auditory system is that the human ear has lower temporal resolution in the lower frequencies and higher temporal resolution in the higher frequencies. Based on that, the system uses a spectro-temporal varying method which introduces the concept of frequency-smoothing by modifying the estimation of the a posteriori SNR. In addition, the system also makes the a priori SNR time-smoothing factor depend on frequency. As a result, the present method has better performance in reducing the amount of musical noise and preserves the naturalness of speech especially in very noisy conditions than do conventional methods.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the Figures are not necessarily to scale, emphasis instead being placed upon illustrating the principles of the invention. Moreover, in the Figures, like reference numerals designate corresponding parts throughout the different views.

DETAILED DESCRIPTION OF THE SYSTEM

The classic noise reduction methods use a uniform bandwidth filter bank and treats each band independently. This does not match with the human auditory filter bank where low frequencies tend to have narrower bandwidth (higher frequency resolution) and higher frequencies tend to have wider bandwidth (lower frequency resolution). In the present approach, we first modify the a posteriori SNR in general accordance with an auditory filter bank in two different ways by calculating the a posteriori SNR using a non-uniform filter bank and using an asymmetric IIR filter. The noisy signal is divided into filter bands where the filter bands at lower frequencies are narrower to coincide with the better frequency resolution of the human ear while the filter bands at higher frequencies are wider because of less frequency resolution of the human ear. Each filter sub-band is then broken up into a plurality of frequency bins. Using broader filter bands at the higher frequencies reduces processing since there is no improvement at those frequencies by having narrower filter bands. The system focuses processing only where it can do the most good.

Figure 4:
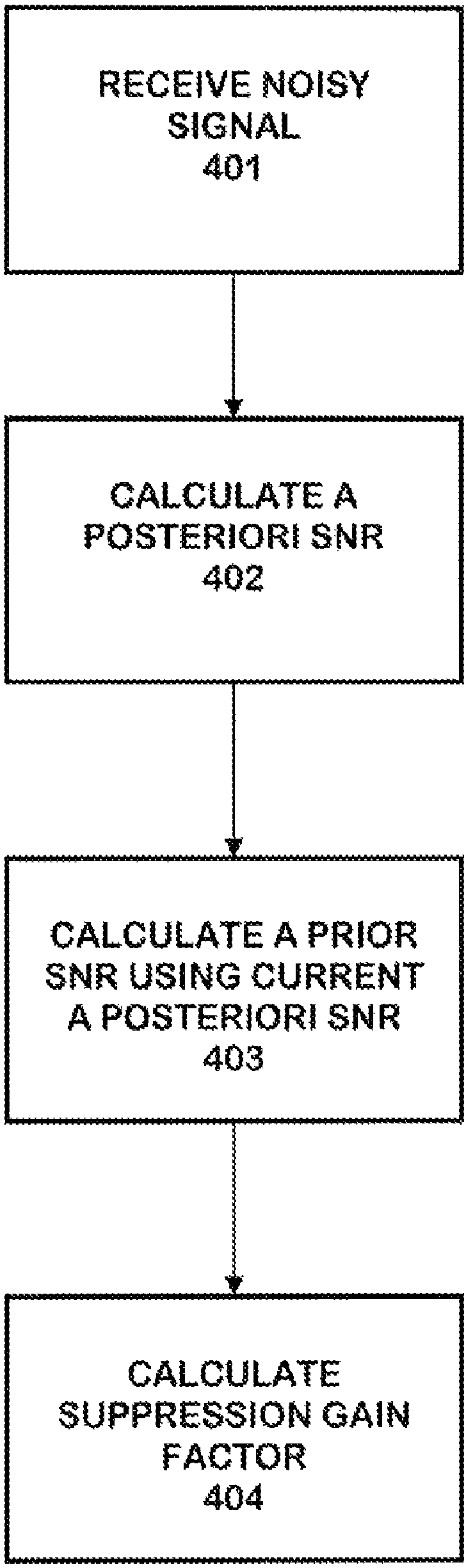
FIG. 4 is a flow diagram of an embodiment of the system.

FIG. 4 is a flow diagram illustrating the operation of an embodiment of the system. At step 401*a* noisy signal is received. This signal is comprised of voice and noise data. At step 402 the a posteriori SNR is calculated. At step 403 the a pirori SNR is calculated using the previously calculated a posteriori SNR value of the same signal sample. With both a priori and a posteriori SNR values available, a suppression gain factor can be calculated at step 404. Note that this step ultimately allows the calculation of the suppression gain at step 407 without waiting one sample period, speeding up processing.

The system proposes a number of methods of calculating a posteriori SNR. In one method, a non-uniform filter bank is used. In another embodiment, an asymmetric IIR filter is used to generate a posteriori SNR. In a subsequent step, the resulting a posteriori SNR generated from either embodiment is used to generate a priori SNR. A suppression gain factor can then be calculated and used to clean up the noisy signal.

1. Calculate the a Posteriori SNR Using a Non-Uniform Filter Bank

Figure 5:
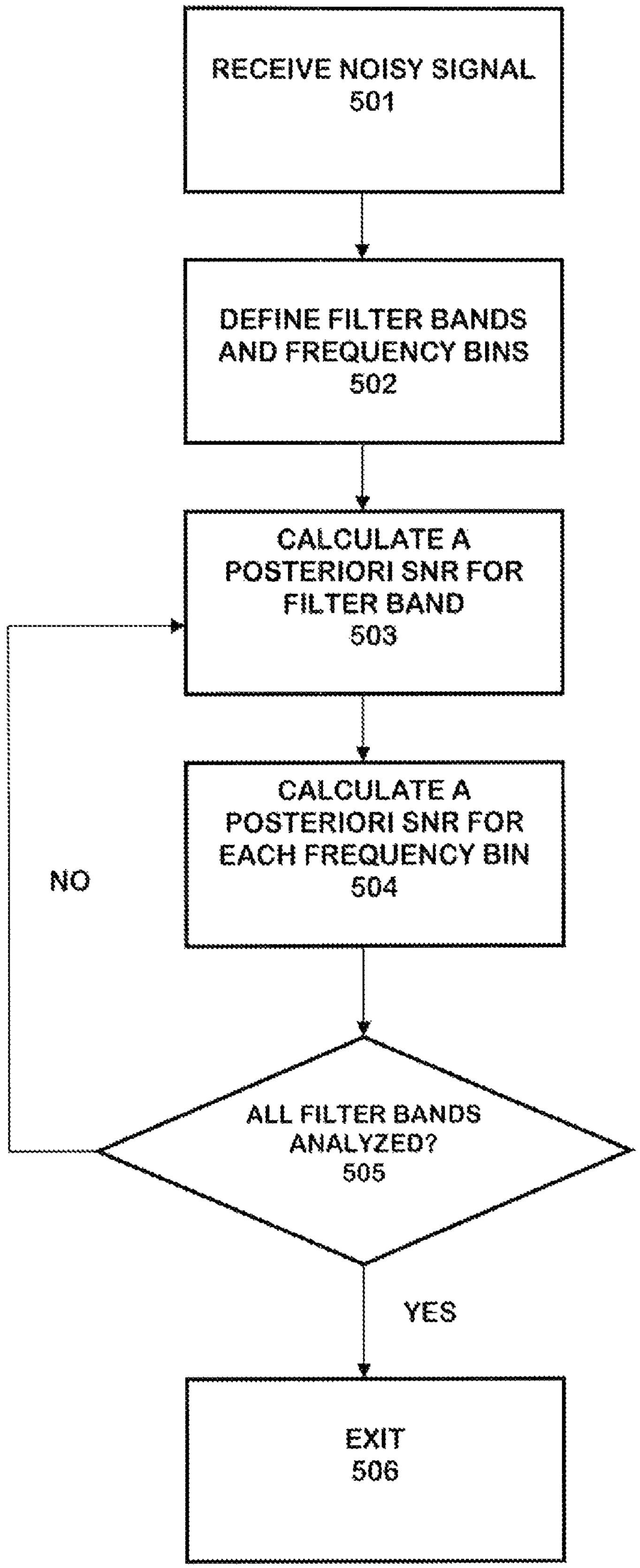
FIG. 5 is a flow diagram illustrating one embodiment for calculating a posteriori SNR.

In one embodiment, the a posteriori SNR is calculated using non-uniform filter bands and is calculated for each band and each bin. FIG. 5 is a flow diagram illustrating this embodiment. At step 501 the noisy signal is received. At step 502 the signal is divided into filter bands and each filter band is divided into frequency bins. At step 503 the a posteriori SNR for a filter band is calculated. At step 504 the a posteriori SNR for each frequency bin in that filter band is calculated. At decision block 505 it is determined if all filter bands have been analyzed. If so, the system exits at step 506. If not, the system returns to step 503 and calculates a posteriori SNR for the next filter band. The calculation scheme used in this embodiment are as follows:

Each sub-band is estimated by:

$$S\hat{N}R_{post}(n,m)=\frac{\sum_k H(m,k)|Y_{n,k}|^2}{\sum_k H(m,k)\sigma(n,k)^2} \quad (5)$$

And the a posteriori SNR at each frequency bin is calculated by $$S\hat{N}R_{post}(n,k)=\xi(k)\sum_m S\hat{N}R_{post}(n,m)H(m,k) \quad (6)$$

Figure 1:
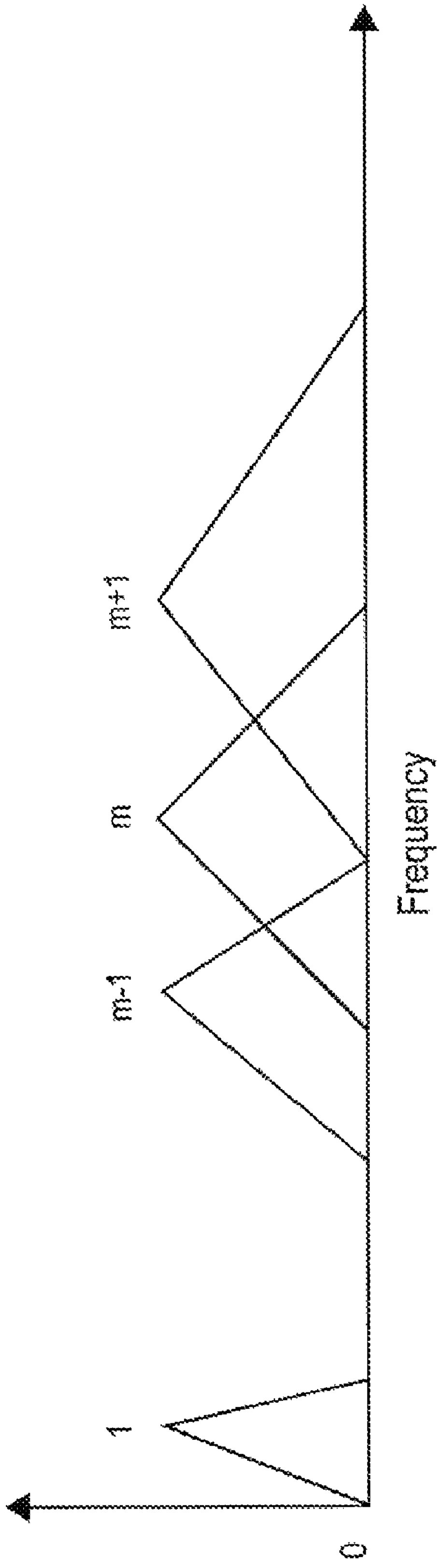
FIG. 1 is an example of a filter bank in one embodiment of the system.

Here H(m,k) denotes the coefficient of mth filter band at kth bin. These filter bands have the properties that lower frequency bands cover a narrower range and higher frequency bands cover a wider range. FIG. 1 is an example of a filter bank for use with an embodiment of the system. FIG. 1 shows one group of the proposed filter bank across different frequencies. As can be seen, the lower frequency bands, such as bands 1 and m−1, are narrower than the later frequency bands such as m and m+1. This is because the human ear has better discrimination at lower frequencies and less discrimination at higher frequencies. ξ(k) is a normalization factor. It can be seen that the filters are non-uniform, and that their band-width may be calculated according to a MEL, Bark, or ERP scale (ref).

2. Calculate the a Posteriori SNR Using an Asymmetric IIR Filter

Figure 6:
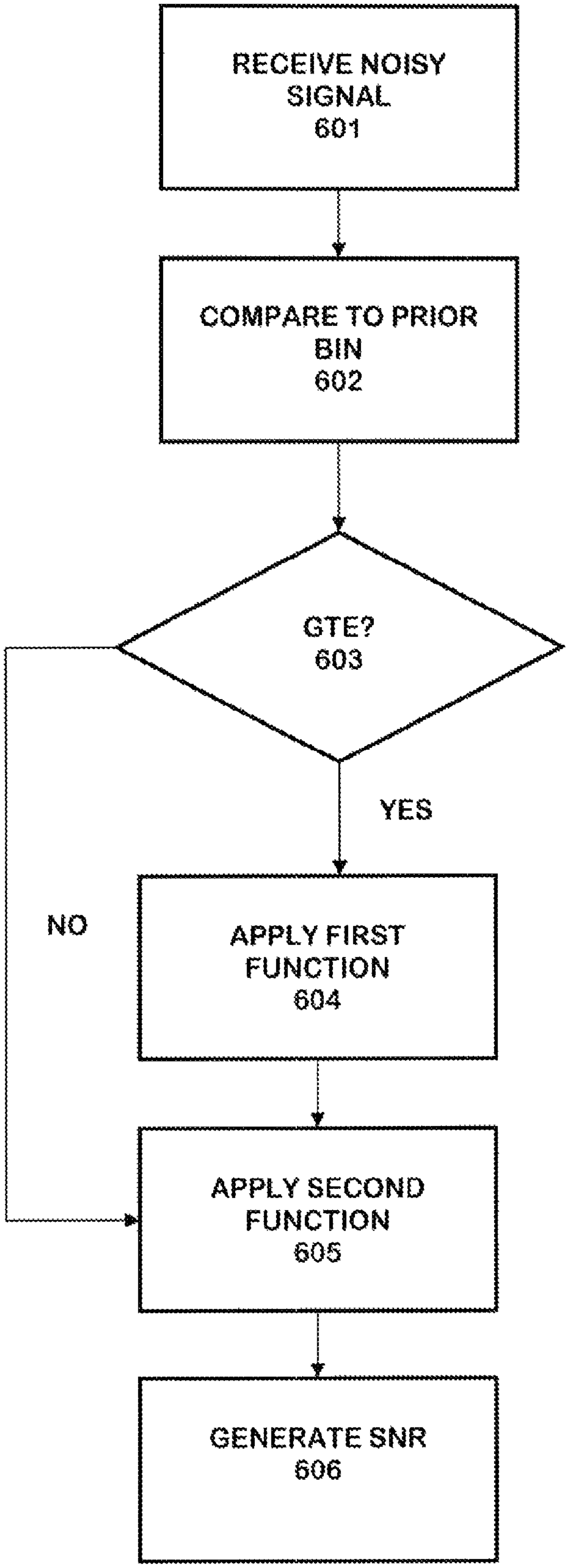
FIG. 6 is a flow diagram illustrating another embodiment for calculating a posteriori SNR.

In an alternate embodiment we apply an asymmetric IIR filter to the short-time Fourier spectrum to achieve a smoothed spectrum. FIG. 6 is a flow diagram illustrating the operation of this embodiment. At step 601 the noisy signal at a frequency bin is retrieved. At step 602 this value is compared to the noisy signal value at the prior frequency bin. At decision block 603 it is determined if the current value is greater than or equal to the prior value. If so, then a first smoothing function is applied at step 604. If not, then a second smoothing function is applied at step 605. At step 606, the calculated smoothed value is used to generate the a posteriori SNR for that frequency bin.

In this embodiment, a smoothed value $\overline{Y}(k)$ is generated by applying one or the other of two smoothing functions depending on the comparison of the current bins signal value to the prior bins signal value as shown below.

$$\overline{Y}_n(k)=\beta_1(k)*Y_n(k)+(1-\beta_1(k))*\overline{Y}_n(k-1) \text{ when } Y_n(k)\geqq\overline{Y}_n(k-1)$$

$$\overline{Y}_n(k)=\beta_2(k)*Y_n(k)+(1-\beta_2(k))*\overline{Y}_n(k-1) \text{ when } Y_n(k)<\overline{Y}_n(k-1) \quad (7)$$

Here $\beta_1(k)$ and $\beta_2(k)$ are two parameters in the range between 0 and 1 that are used to adjust the rise and fall adaptation rate. For example, when a new value is encountered that is higher than the filtered output, it is smoothed more or less than if it is lower than the filtered output. When the rise and fall adaptation rates are the same then the smoothing may be a simple IIR. When we choose different values for the rise and fall adaptation rates and also make them vary across frequency bins, the smoothed spectrum has interesting qualities that match an auditory filter bank. For example when we set $\beta_1$ and $\beta_2$ to be close to 1 at bin zero and decay as the frequency bin number increases, the smoothed spectrum follows closely to the original spectrum at low frequencies and begins to rise and follow the peak envelop at high frequencies.

Figure 2:
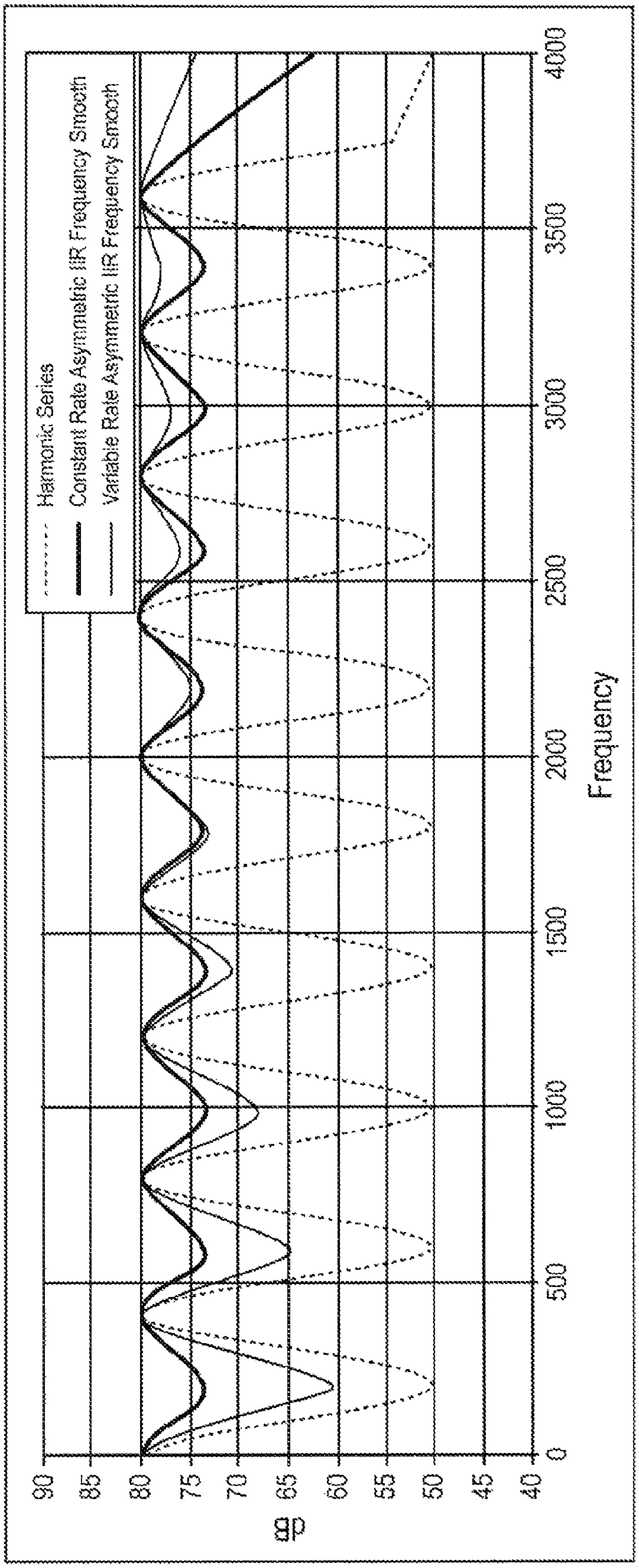
FIG. 2 illustrates a smoothed spectrum after applying an asymmetric IIR filter.

The same filter can be run through the noise spectrum in forward or reverse direction to achieve better result. FIG. 2 shows a simulation result of applying this filter on a modulated Cosine signal.

This smoothed spectrum is then used to calculate the a posteriori SNR $$S\hat{N}R_{post}(n,k)=\frac{|\overline{Y}_n(k)|^2}{\sigma(n,k)^2} \quad (8)$$

3. Calculate the a Priori SNR Using the Computed a Posteriori SNR

The a posteriori SNR generated using either embodiment above can then be used to calculate the a priori SNR using equation (1), (2), and (3) with some modifications as noted below:

We modify the "decision-directed" method in equation (2) as follows:

$$S\hat{N}R_{priori}(n,k)=\alpha(k)\frac{|\hat{X}(n-1,k)|^2}{|\sigma(n,k)|^2}+(1-\alpha(k))P(S\hat{N}R_{post}(n,k)-1) \quad (9)$$

Figure 3:
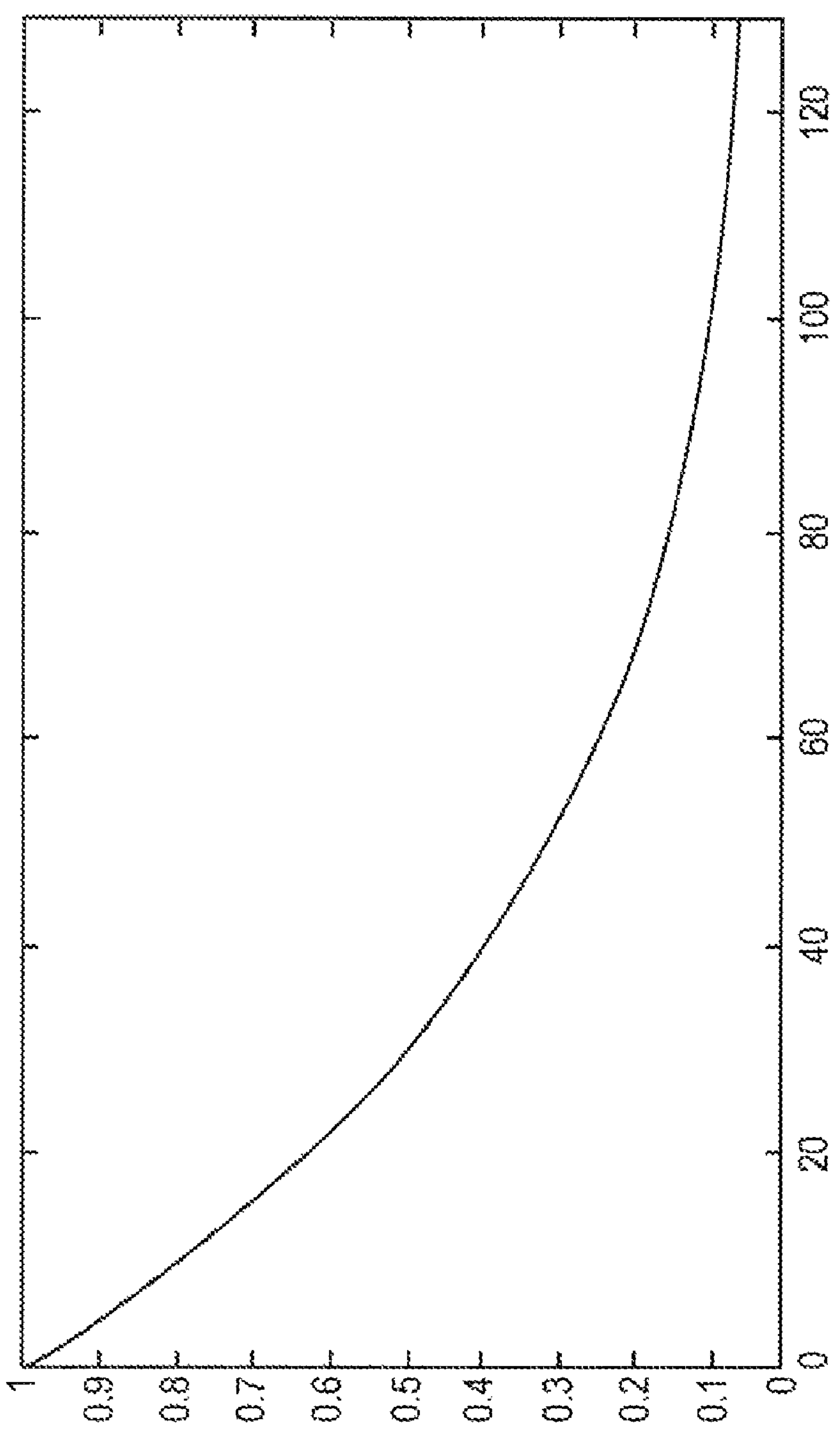
FIG. 3 is an example of a decay curve.

Instead of using a constant averaging factor for all frequency bins, we introduce a frequency-varying averaging factor α(k) which decays as frequency increases. FIG. 3 shows an example of such a decay curve. This matches up with the need for greater fidelity in the lower frequencies and less fidelity in the higher frequencies. Other suitable curves may be used without departing from the scope and spirit of the system. Finally, α(k) may be asymmetric to differentially smooth onsets and decays, which is also a characteristic of the human auditory system (e.g., pre-masking, post-masking). For example α(k) may be 1 for all rises and 0.5 for all falls, and both may decay independently across frequencies.

Similarly, we modify the recursive version in equation (3) to as:

$$S\hat{N}R_{priori}(n,k)=\text{MAX}(G(n-1,k),\delta(k))S\hat{N}R_{post}(n,k)-1 \quad (10)$$

Here δ(k) is a frequency varying floor which increases from a minimum value (e.g., 0) to a maximum value (e.g., 1) over frequencies.

4. Generate Suppression Gain Factor and Apply Noise Reduction

After the a priori SNR is generated, a suppression gain factor can be generated as noted in equation (4) above. The suppression gain factor can then, be applied to the signal as below: $|\hat{X}_{n,k}|=G_{n,k}|Y_{n,k}|$ Noise: reduction methods based on the above a priori SNR are successful in reducing musical noise and preserving the naturalness of speech quality. The illustrations have been discussed with reference to functional blocks identified as modules and components that are not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A method for calculating and applying a suppression gain factor comprising:

calculating an a posteriori SNR value of a sample of an input signal having voice and noise data;

calculating an a priori SNR of the input signal using the a posteriori SNR value of the same sample of the input signal and without using an a posteriori SNR value of a prior sample;

using the a priori SNR and a posteriori SNR to calculate the suppression gain factor;

applying the suppression gain factor to the input signal to reduce the noise data;

wherein the a priori SNR is calculated using the a posteriori SNR and applying a frequency varying averaging factor that decays as frequency increases.

2. The method of claim 1 wherein the calculation of the a posteriori SNR is accomplished using a non-uniform filter bank.

3. The method of claim 2 wherein the calculation of the a posteriori SNR is accomplished by defining a plurality of filter bands each having a plurality of frequency bins.

4. The method of claim 3 wherein the filter bands are narrower at lower frequencies and wider at higher frequencies.

5. The method of claim 4 wherein an a posteriori SNR value is calculated for each filter band.

6. The method of claim 5 wherein the a posteriori SNR value for each filter band is calculated by:

$$\hat{SNR}_{post}(n, m) = \frac{\sum_k H(m, k)|Y_{n,k}|^2}{\sum_k H(m, k)\sigma(n, k)^2}$$

Where H (m,k) denotes the coefficient of $^m$th filter band at $^k$th bin;

$\hat{SNR}_{post}$ (n,m) denotes a posteriori SNR for filter band (n,m)

$Y_{n,k}$ denotes a smoothing function and $\sigma_{n,k}$ denotes a frequency varying averaging factor.

7. The method of claim 6 where the a posteriori SNR value for each frequency bin is calculated by:

$$\hat{SNR}_{post}(n, k) = \xi(k)\sum_m \hat{SNR}_{post}(n, m)H(m, k)$$

where $\xi(k)$ denotes a normalization factor.

8. The method of claim 1 wherein calculation of the a posteriori SNR is accomplished using an asymmetric IIR filter.

9. The method of claim 8 wherein the calculation of the a posteriori SNR is accomplished using a first function when the current bin has a signal value greater than or equal to the signal value of the previous bin.

10. The method of claim 9 wherein the calculation of the a posteriori SNR is accomplished using a second function when the current bin has a value less than the previous bin.

11. The method of claim 10 wherein the calculation of the a posteriori SNR is accomplished by:

$$\overline{Y}_n(k)=\beta_1(k)*Y_n(k)+(1-\beta_1(k))*\overline{Y}_n(k-1) \text{ when } Y_n(k) \geqq \overline{Y}_n(k-1)$$

$$\overline{Y}_n(k)=\beta_2(k)*Y_n(k)+(1-\beta_2(k))*\overline{Y}_n(k-1) \text{ when } Y_n(k) < \overline{Y}_n(k-1)$$

where $\beta_1(k)$ and $\beta_2(k)$ are two parameters in the range between 0 and 1.

12. The method of claim 1 wherein the frequency varying averaging factor is asymmetric with a first averaging factor for onsets and a different second averaging factor for decays, and wherein the first averaging factor and the second averaging factor both decay independently as frequency increases.

13. The method of claim 1 wherein the a priori SNR is calculated by:

$$\hat{SNR}_{priori}(n, k) = \alpha(k)\frac{|\hat{X}(n-1, k)|^2}{|\sigma(n, k)|^2} + (1-\alpha(k))P(\hat{SNR}_{post}(n, k) - 1)$$

where $\hat{X}$ denotes a suppressed signal.

14. A method for calculating and applying a suppression gain factor comprising:

calculating an a posteriori SNR value of an input signal having voice and noise data;

calculating an a priori SNR of the input signal using the a posteriori SNR value;

using the a priori SNR and a posteriori SNR to calculate the suppression gain factor;

applying the suppression gain factor to the input signal to reduce the noise data wherein the calculation of the a posteriori SNR is accomplished using a non-uniform filter bank, by defining a plurality of filter bands each having a plurality of frequency bins wherein the filter bands are narrower at lower frequencies and wider at higher frequencies, and wherein an a posteriori SNR value is calculated for each filter band by:

$$\hat{SNR}_{post}(n, m) = \frac{\sum_k H(m, k)|Y_{n,k}|^2}{\sum_k H(m, k)\sigma(n, k)^2}$$

Where H (m,k) denotes the coefficient of $^m$th filter band at $^k$th bin;

$\hat{SNR}_{post}$(n,m) denotes a posteriori SNR for filter band (n,m);

$Y_{n,k}$ denotes a smoothing function;

and $\sigma_{n,k}$ denotes a frequency varying averaging factor;

where the a posteriori SNR value for each frequency bin is calculated by:

$$\hat{SNR}_{post}(n, k) = \xi(k)\sum_m \hat{SNR}_{post}(n, m)H(m, k)$$

where $\xi(k)$ denotes a normalization factor.

* * * * *